June 6, 1967 C. K. GUTH 3,323,485
MODULAR INDICATOR BOARD
Filed May 24, 1965

INVENTOR
CHESTER K. GUTH

BY

ATTORNEY

United States Patent Office 3,323,485
Patented June 6, 1967

3,323,485
MODULAR INDICATOR BOARD
Chester K. Guth, St. Petersburg, Fla., assignor to Oravisual Company, Incorporated, St. Petersburg, Fla., a corporation of Florida
Filed May 24, 1965, Ser. No. 457,974
3 Claims. (Cl. 116—134)

The present invention relates to an indicator board or panel having alternately positionable indicators thereon which may be manipulated to selectively display a distinctive signal which cooperates with subject matter appearing on the board to record or indicate certain conditions or information.

It is frequently desirable to provide a board or panel which can be displayed for indicating certain conditions or events which may change from time to time and the indicating medium can be readily altered to maintain correct information or records. Boards of the character mentioned generally have printed matter in one or more lines followed in line by one or more indicator means which can be set in alternative indicating positions, and in many instances printed subject matter may appear at the top of vertical columns in which the indicator means are also aligned. Because such indicator boards have utility in a wide variety of situations the numbers and arrangements of the individual indicator units for different boards vary widely and assembly thereof has heretofore been relatively complicated and inconvenient.

The principal object of the present invention is the provision of a new and improved indicator unit which can be conveniently assembled with a multiplicity of like units to form appropriate indicator sections of indicator boards or panel of many different sizes and arrangements and in which the units may be arranged in lines of columns opposite or under appropriate printed subject matter, the units being readily manipulated to alternative indicating conditions. Thus, indicator boards may be assembled from like units to accommodate widely varying requirements with a minimum of work and skill in assembly thereof.

A more specific object of the present invention is the provision of an improved indicator unit comprising a body having a rectangular face in which an opening is formed by which a distinctive colored flange or flag can be selectively displayed, which flange is shiftable into and out of its display position by an operating member projecting from the plane of the face of the unit, the body also having top, bottom and sides with interlocking means by which a multiplicity of like units can be readily assembled and locked together to form a rectangular display panel or board in which the faces of the individual units form the face of the board and are positioned in lines and columns.

A further object of the invention is provision of an indicator unit of the character mentioned comprising a hollow body having a rectangular front face provided with an opening therein extending transversely thereof from one edge to the other and having its long edges spaced from the other two edges to form panels and through which an end portion of a toggle member pivoted inside the body is movable between positions at the opposite long edges of the opening and which member is retained in one position or the other by an overcenter spring, the toggle member having flange or flag portions projecting from opposite sides thereof which are colored distinctively and alternatively register with the opening in the front face of the unit so that one color or the other will appear in the opening according to the position of the toggle member while the other flag is behind a wall panel.

Other objects and advantages of the invention will be apparent from the following description of a preferred form thereof, reference being made to the accompanying drawings wherein.

Figure 2:
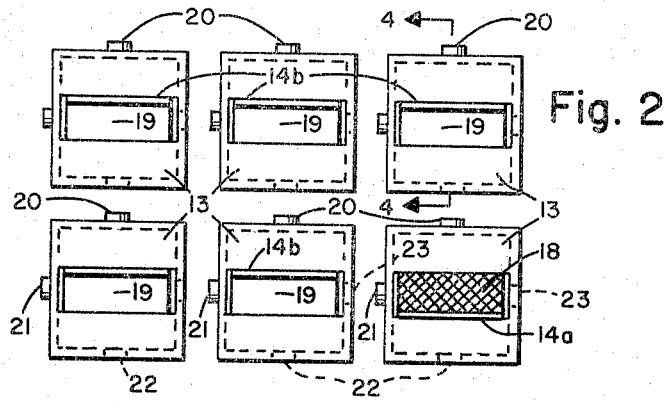
FIG. 2 is a front elevational view of a plurality of the indicator units forming a portion of the indicator board.
Figure 6:
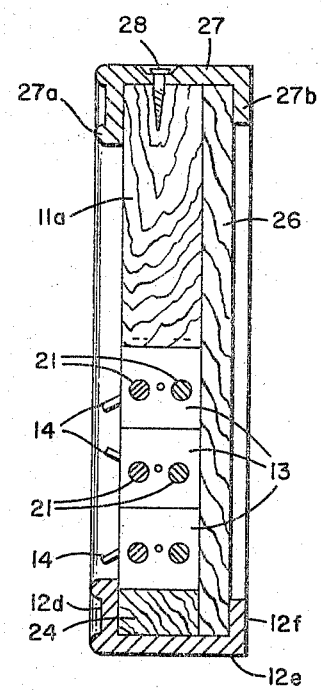
FIG. 6 is a sectional view taken along line 6—6 of FIG. 1, but on a larger scale.
Figure 3:
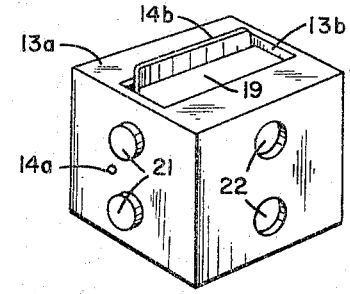
FIG. 3 is a perspective view of one of the indicator units.

Referring to the drawings, a doctor's attendance register board 10 embodying the invention is shown and it comprises a panel 11, the edges of which are enclosed by a frame 12, and which may be attached to a wall, not shown, or otherwise supported for display, as desired. The panel 11 includes the names of the doctors arranged in a column at the left side of the panel and the notations "In," "A.M." and "P.M." are in a line at the right hand side of the panel. It will be appreciated that the invention could be similarly employed for providing indicator panels for many types of information other than that shown. Nine indicator units 13 are positioned at the right hand side of the panel and are arranged so that three units are in line with each doctor's name and the units opposite each name are in columns beneath the "In," "A.M." and "P.M." notations, respectively.

Referring more particularly to the individual indicator units 13, each unit comprises a box-like or hollow cube shaped body which may be formed of any suitable material, such as a molded resin, wood, plastic or metal, and includes a front wall or face 13a which is preferably square and which has a rectangular opening or window 13b in the central portion thereof which extends substantially entirely across the wall and the opposite elongated edges are spaced from the parallel edges of the wall to form wall panels at opposite sides of the opening which are slightly larger than the area of the opening.

A flat, U-shaped indicator member 14, has the ends of the two parallel legs thereof pivotally supported on opposite side walls 13c and 13d of the unit by pins 14a attached thereto and supported in openings in the side walls. The unpivoted end or yoke of indicator member 14 projects through the window 13b and provides a wide, convenient finger tab 14b which extends beyond the front face 13a of the unit for ready manipulation of the indicator member. Means are provided for retaining the member 14 against whichever edge of the opening 13b it is moved and comprises a tension spring 15, one end of which is anchored to an eye 17 formed on the rear wall 13e of the unit, and the opposite end of which is hooked in an opening through the yoke of the indicator member. It will be seen that spring 15 is positioned so that its center of force will lie on one side or the other of the centerline of the toggle member when the member is against the top or bottom edges of the opening 13b and will urge the end 14b to either the top or bottom edge thereof, depending upon its positioning by an operator. Two rectangular flanges or flags 18, 19 are formed integral with the member 14 and project from the top and bottom thereof respectively and substantially completely register with the window 13b when the indicator member is in its lower and upper positions, respectively, as may be seen by referring to FIG. 4. The flags are disposed at an angle to the indicator proper such that they extend parallel to the front wall 13a when they are positioned in registration with the window. When one flag is in registration with the window 13b the other is out of view behind the front wall panel at one side or the other of the window, as the case may be.

Figure 4:
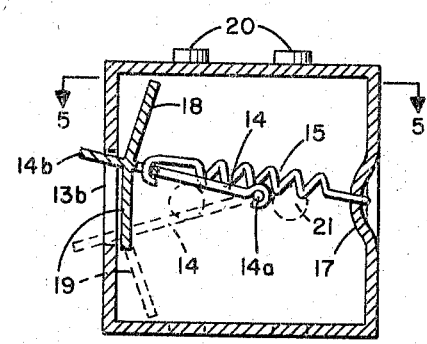
FIG. 4 is a view of an indicator unit taken along line 4—4 of FIG. 2, but on a larger scale.

In the preferred form of the invention the front surface of unit wall 13a is preferably coated with a material suitable for chalk marking and the indicator panel 19 has its outer surface treated in the same manner. In the present instance, the panel 19 has a covering which is of the same color and material as the coating on the front of wall 13a. The front of panel 18 has a coating 18a which is a distinctively different color than panel 19 whereby when the member 14 is in its raised position the panel 19 appears in the opening 13b and is practically indistinguishable from the surface to the front face 13a. When member 14 is in the lowered position, as indicated in FIG. 4, surface 18a appears in the opening 13b and displays a distinctive color relative to the face 13a. As an example, the faces 13a and flag 19 may be of a dark green color and panel 18 a bright yellow. Additionally, chalk notations may be made on the faces of the units and flags 19, if desired.

To permit units 13 to be readily assembled into a board, the top wall of each unit has a pair of spaced locating pins 20 projecting therefrom and a similar pair of pins 21 project from the side wall 13c thereof. The bottom wall 13f has a pair of circular openings 22 which are spaced apart the same distance as the pins 20 and are of a diameter to closely receive the pins 20 of another like unit 13. Side wall 13d has a pair of openings 23 therein which are spaced apart the same distance as the pins 21 and are of a diameter to closely receive the pins 21 of a like unit 13. It will be appreciated that the pins 20, 21 are received in the openings 22, 23 respectively of like units assembled together in the form of a panel, as indicated in FIG. 2 in which the relative positions of the units are shown, but in this figure the units have been shown slightly spaced from one another for more clearly showing the manner in which they are arranged to be assembled to form a panel.

Figure 1:
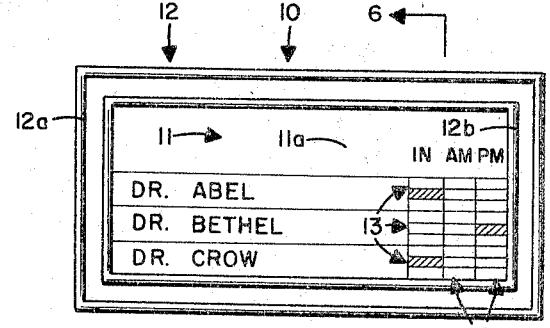
FIG. 1 is a front elevational view of a register board for a doctor's office, the board of the register comprising a plurality of indicator units embodying the invention.
Figure 5:
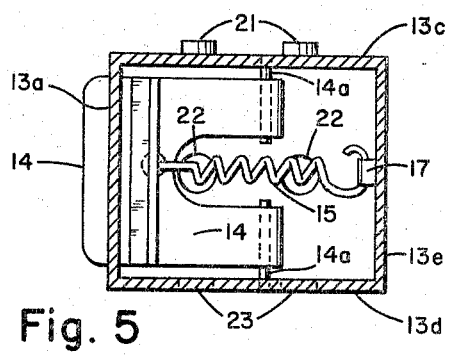
FIG. 5 is a sectional view taken along line 5—5 of FIG. 4.

In forming the register board 11, a U-shaped partial frame is assembled comprising extruded aluminum strips 12a and 12b suitably joined to opposite ends of a yoke strip 12c and at right angles thereto. The strips have a face flange 12d and rearwardly extending side flanges 12e, the rear edges of which have a lip 12f therealong. A board 11a of any suitable material, such as wood or fibre board, is formed to be received in the frame and lie against the insides of flanges 12d, 12e. The board 11a has a square portion cut away at the lower right hand corner, as viewed in FIG. 1, to accommodate the nine units 13 therein as is explained presently. The units 13 may be assembled prior to the insertion of the board into the frame and the bottom row of units rests on a strip 24 lying on the bottom flange 12e and abutting the inside flange 12d of the front frame 12c. The units 13 are positioned with the pins 20 engaged in openings 22 of the respective units thereabove, and pins 21 are engaged in the openings 23 in the sides 13d of the adjacent units, respectively. Preferably, a filler strip, not shown, of suitable dimension may be inserted between the right hand sides of units 13 and the inside of flange 12e of frame member 12b to hold the units in position. Board 11a is then inserted in position in the frame with its left hand end edge and the lower edge against the side flanges 12e and front flanges 12d. The under side of the square opening in board 11a has recesses, not shown, for receiving the pins 20 of the upper row of units 13. A back board 26 is then inserted at the rear of board 11a, the units 13 and filler strip 24, and is held in place by the lips 12f, of the frame members, 12a, 12b, 12c, the dimensions of the back board being such as to engage or nearly engage all of the insides of the partial frame. Next, a capping strip 27 formed like strips 12a, 12b, 12c is attached across the top of the partial frame and is secured by screws 28 (only one of which appears in the drawing) threaded into board 11a. Strip 27 includes a flange 27 extending downwardly across the top of the panel and a lip 27b which extends downwardly across the rear of the panel to retain the top edge of the back board 26 in place. If desired, the backs of the units 13 may be secured to back board 26 by suitable adhesive material.

When it is desired to indicate which doctor is in, the member 14 of the appropriate unit 13 is moved to its lower position wherein the distinctive coloring at 18a is displayed through the opening 13b of the individual units, otherwise the member 14 of each unit is in its upper position in which the surface 19a has the same appearance as the remaining faces of the units.

It will be apparent that any number of lines and columns of units 13 can be conveniently assembled with a minimum of skill and material to provide a wide variety of indicator boards having individual indicators which are easily manipulated for providing readily visible signals or markings.

It will be apparent that although but one form of the invention has been disclosed herein, other modifications, adaptations and forms could be adopted all falling within the scope of the claims which follow.

I claim:
1. A unit for forming an indicator board comprising, a box-like structural unit having a rectangular front wall, said front wall having a rectangular opening therein with opposite sides spaced substantially from and parallel to opposite side edges of said unit, a U-shaped toggle member in said unit having the yoke end thereof extending through said opening, means pivoting the inner leg ends of said toggle member to opposite side walls of said unit whereby said yoke end is movable about said pivot means from one side of said opening to the other, a spring interconnecting the yoke of said toggle member and the wall of the unit opposite said yoke for urging said toggle member to one side or the other of said opening, and two flanges carried by said member and on opposite sides thereof and projecting in the directions of movement of said member whereby one of said panels is in registration with said opening and the other is behind said front wall when said member is in one position and said other flange is in registration with said opening and the first mentioned flange is behind said front wall when said member is in the other of its positions.

2. A unit for forming an indicator comprising, a hollow box-like unit having rectangular walls, one of said walls having a rectangular opening therein extending substantially entirely across said one wall and having two opposite parallel edges spaced substantially from the parallel opposite edges of said one wall whereby rectangular wall panels are provided on opposite sides of said opening, a flat U-shaped toggle member pivoted in said unit and having the yoke end extending through said opening and engageable with opposite edges of said opening when said member is shifted from one side to the other thereof, means pivoting the free ends of the legs of said U-shaped member to opposite side walls of said unit, a tension spring connected at one end to the yoke of said member and the opposite end connected to rear wall of said unit so that the line of force of said spring shifts from one side of the centerline of said toggle member to the other when said member is moved from one edge to the other of said opening, and two flanges carried by said member and disposed on opposite sides thereof and adapted to alternately lie behind said panels of said front wall and whereby one of said flanges is in registration with said opening while the other is behind one of said wall panels when said member is in one of its positions and said other flange is in registration with said opening and the first mentioned flange is behind the other of said wall panels when said member is in the other of its positions.

3. A unit forming an indicator comprising, a body having a rear wall and two spaced opposite side walls extending forwardly from said rear wall, said body having an open front side between the forward edges of said side walls, a toggle member having spaced opposite side portions extending alongside the insides of said side walls respectively, pivot means pivotally supporting said side portions of said toggle member to the respective adjacent side wall and on a common axis, said toggle member having two indicator surfaces extending between said side portions and having a common edge from which said surfaces extend at less than a straight angle relative to one another and presenting two alternate indicia surfaces extending across said open front side of said body, means to limit movement of said toggle member about said pivot means between two positions, one of said indicator surfaces facing forwardly and exposed in said open side of said body when said toggle member is in one of said positions and the other of said surfaces facing forwardly and exposed in said open side of said body when said toggle member is in the other of said positions, and a tension spring attached at one end to said toggle member adjacent to said common edge and attached at the other end to said rear wall of said body intermediate the top and bottom edges thereof to yieldingly urge said toggle member to one or the other of said two positions.

References Cited

UNITED STATES PATENTS

| 2,804,706 | 9/1957 | Sandri | 40—68 |
| 2,814,893 | 12/1957 | Aiken | 40—28 |

FOREIGN PATENTS 733,148  7/1955  Great Britain.

EUGENE R. CAPOZIO, *Primary Examiner.*

W. J. CONTRERAS, *Assistant Examiner.*